United States Patent [19]
Lauvinerie et al.

[11] Patent Number: 4,608,226
[45] Date of Patent: Aug. 26, 1986

[54] METHOD OF FORMING A DIAMOND TOOTH INSERT FOR A DRILL BIT AND A DIAMOND CUTTING ELEMENT FORMED THEREBY

[75] Inventors: Jean-Pierre Lauvinerie, Crespieres; Annick LeFeuvre, Elancourt Maurepas, both of France

[73] Assignee: Norton Christensen, Inc., Salt Lake City, Utah

[21] Appl. No.: 623,352

[22] Filed: Jun. 22, 1984

[51] Int. Cl.⁴ .............................................. B22F 7/00
[52] U.S. Cl. ......................................... 419/5; 419/11; 419/48; 76/DIG. 12; 76/101 R; 125/39; 175/329; 299/89; 408/199; 428/408
[58] Field of Search ................... 419/5, 11, 66, 48; 76/DIG. 12, 101 R; 125/39; 175/329; 299/89; 408/199; 428/408

[56] References Cited
U.S. PATENT DOCUMENTS

| | | | |
|---|---|---|---|
| 4,205,425 | 6/1980 | Shinozaki | 419/11 X |
| 4,234,661 | 11/1980 | Lee et al. | 419/11 X |
| 4,241,135 | 12/1980 | Lee et al. | 419/11 X |
| 4,554,130 | 11/1985 | Ecer | 419/65 X |

*Primary Examiner*—Stephen J. Lechert, Jr.
*Attorney, Agent, or Firm*—Beehler, Pavitt, Siegemund, Jagger, Martella & Dawes

[57] ABSTRACT

An improved bond between diamond and a metallic matrix can be achieved by hot pressing the metallic matrix onto a cleaned polycrystalline diamond (PCD) element. The PCD is degreased and then maintained substantially free from subsequent oxidation. The cleaned nonoxidized PCD is then disposed within a hot press and bonded under pressure and temperature with a conventional metallic matrix to form a cutting element. The cutting element thus formed is comprised of a PCD portion and a metallic portion with a high strength bond formed therebetween, on at least one surface of the diamond and, preferably, two adjacent surfaces. Typically, the metallic matrix is a carbide-forming metal or mixture of carbide-forming metals, and the diamond is a thermally stable porous, sintered polycrystalline product. The insert is subsequently placed within a bit mold and a bit is fabricated according to conventional powder metallurgical infiltration techniques. The diamond-to-metal bond in the insert remains stable during the furnacing of the infiltration bit, and a high-strength bond is formed between the metallic portion of the insert and the matrix body bit.

11 Claims, 10 Drawing Figures

METHOD OF FORMING A DIAMOND TOOTH INSERT FOR A DRILL BIT AND A DIAMOND CUTTING ELEMENT FORMED THEREBY

FIELD OF THE INVENTION

The invention relates to the field of earth boring tools and, more particularly, to diamond cutting elements and the method of manufacturing the same.

DESCRIPTION OF THE PRIOR ART

The use of natural diamond impregnated segments in drill bits is well known to the art. A typical example of such impregnated bits is shown by Cortes, "Diamond-Studded Drilling Tool", U.S. Pat. No. 3,696,875. In Cortes, the cutting elements are diamond-grit impregnated blades set into an infiltrated matrix body bit. The diamond impregnated blades form the cutter elements. It is also well known to place natural diamonds within an infiltrated matrix bit such as shown by Rowley, et al., "Diamond Drill Bits", U.S. Pat. No. 3,709,308. Generally, these two types of diamond bits represented the most common types of designs prior to the commercial introduction of synthetic diamonds.

After synthetic diamonds became commercially available, large synthetic cutting elements mounted on studs became available and are generally denoted in the trade under the trademark, Stratapax Stud Cutters as originally sold by General Electric Company. The synthetic Stratapax diamond is attached to a cemented carbide stud through a low temperature braze. The stud, in turn, is either then mounted by various means in a steel body bit or in a matrix body bit as typified by Rowley, et al., "Earth-Boring Drill Bits", U.S. Pat. No. 4,244,432. The synthetic diamond tables are necessarily bonded to a cemented carbide stud and then placed within the matrix bit also typically through a mechanical press fit or low temperature brazing or welding process because the synthetic diamond cutting element is unstable at the furnacing temperatures and time periods required for the manufacture of a matrix body bit.

Thereafter, somewhat more thermally stable, polycrystalline diamond cutter element became commercially available under the trademark, Geoset, as sold by General Electric Company. Another type of thermally stable polycrystalline diamond cutter often referred to as being silicon-bonded, has also been developed. The prior art literature from General Electric suggested incorporating Geoset polycrystalline diamond (PCD) into a matrix body bit by fully or substantially embedding the PCD into the matrix body in much the same way as had previously been practiced with natural diamond matrix body bits, particularly inasmuch as the Geoset PCD was comparable in size to natural diamonds as used in drill bits. It is considered necessary in the prior art to substantially embed such diamonds in order to retain them on the bit under the tremendous stresses to which they are subjected when drilling, because both natural and synthetic diamond do not strongly bond to the metal matrix which comprises the matrix body. If the synthetic or natural diamond is somewhat porous or has a microscopically rough surface, it is possible that to some extent mechanical bonding is achieved between an infiltrated matrix metal backing and the diamond. However, it has been determined that such micromechanical bonding as may occur is totally inadequate as a practical matter to retain the diamond on the drill bit face during an actual drilling operation.

Horn, "Rotary Drill Bit", U.S. Pat. No. 3,938,599 shows a infiltrated matrix body bit in which natural or synthetic diamonds are proposed for usage as the cutting elements of the bit. Horn. however, fails to disclose any means or methodology for securing the diamonds to the bit face. Horn simply states that the cutting teeth are integrally formed with the matrix portion of the bit and may, themselves, be comprised of matrix material except for the diamonds set in the teeth. Other than stating that the diamond is "set in" (Column 2, Lines 29 and 50), "mounted on" (Column 3, Line 62) or "is bonded to and supported by the matrix" (Column 3, Line 63), Horn fails to show how such setting, bonding or support is actually accomplished. Neither of the methods proposed by Horn to use polycrystalline diamond cutters are practical. Firstly, the method suggested by FIG. 5 of Horn is impractical because the stratapax-type cutters suggested thereby will not withstand the required infiltration temperatures. Secondly, the present applicant has made numerous attempts using conventional materials to bond to a metal matrix by infiltration Geoset cutters having one triangular face fully exposed such as might be suggested by FIG. 7 of Horn. The bonding achieved is insufficient for commerical drill bits.

A stronger diamond bond can be achieved by bonding the diamond to the cutter element directly within the diamond press as the diamond is formed or sintered. Such a prior technique is shown by Wentorf, Jr., "Diamond Tools for Machining", U.S. Pat. No. 3,745,623. The tremendous pressures and temperatures required to form a diamond or sinter a diamond within a diamond press, however, inherently limits the size of the diamond cutter that can be produced within such a press. Moreover, the time and expense required for the use of diamond presses to manufacture cutter elements also increases their cost. Furthermore, the diamond cutter as described by Wentorf is sintered from diamond grit and bonded to a sintered tungsten carbide backing. The difference in the thermal coefficient of expansion between diamond and carbide often causes the bond formed therebetween to weaken or fail during the furnacing step in the bit manufacturing process when cutter elements produced by Wentorf's process are directly included within an infiltrated matrix body bit.

Therefore, what is needed is a method for attaching a thermally stable synthetic diamond to an infiltrated matrix body bit such that the bond between the diamond cutting element and the matrix body bit has the strength required to actually perform during the drilling operation even when the bit and the cutting elements are manufactured using conventional powder metallurgical infiltration techniques.

BRIEF SUMMARY OF INVENTION

The present invention is a method of forming a diamond cutting element for use in a drill bit. The method comprises the steps of cleaning a preformed diamond element and then hot pressing a metallic matrix about the cleaned diamond element to form the cutting element. By reason of this combination of steps, a secure bond is established between the cleaned diamond element and the metallic matrix forming the remaining portion of the cutting element. Preferably the preformed diamond element is maintained in a clean, degreased and nonoxidized condition at all times after the step of cleaning and until it is hot pressed with the metallic matrix.

More specifically, the method of the invention is a method for forming a diamond cutting element for use in a matrix body bit comprising the steps of cleaning a thermally stable, porous polycrystalline diamond element (PCD) and hot pressing the cleaned diamond element with a carbide forming matrix material to thereby form an insert. The insert is then infiltrated into a matrix body bit to form the finished drill bit.

The present invention further includes a cutting element for use within a cutting tooth of a matrix body bit. The cutting element comprises a thermally stable, polycrystalline diamond element and a hot pressed metallic matrix portion which is intimately disposed on at least one surface of the diamond element. By reason of this combination, the diamond element and its hot pressed metallic matrix portion form a cutting element for inclusion within a cutting tooth in a matrix body bit, which is then fabricated according to conventional powder metallurgical techniques. In the preferred embodiment the cutting element includes a metallic matrix portion which is intimately bonded to at least two adjacent surfaces of the diamond element. The metallic matrix portion is intimately bonded to a lower surface of the diamond element and to a rear surface of the diamond element to form a root and trailing support, respectively.

These and other embodiments of the invention can better be understood by first turning to the following figures, wherein like elements are referenced by like numerals.

These, and other embodiments of the invention, are better understood by now considering the above figures in light of the following detailed description.

DETAILED DESCRIPTION OF THE PREFERRED EMBODIMENTS

The present invention is a method for forming a synthetic polycrystalline diamond (PCD) cutting tooth for use in an infiltrated matrix body bit. A bond is formed between the PCD and a cutter insert body, which bond is of sufficient strength to be of practical utility in a rotary or rotating drill bit. The method of the invention comprises the steps of taking a preformed, thermally stable porous PCD and hot pressing the PCD into a predetermined tooth structure. The tooth structure is then molded into a matrix body bit through conventional powder metallurgical infiltration techniques. The invention can better be understood by first considering the tooth structures formed according to the invention as diagramatically depicted in FIGS. 1-5. One of the illustrated embodiments is then described in greater detail in connection with its application in a petroleum coring bit as described in FIGS. 6-8. The methodology of the invention is illustrated in connection with FIGS. 9 and 10.

Figure 1:
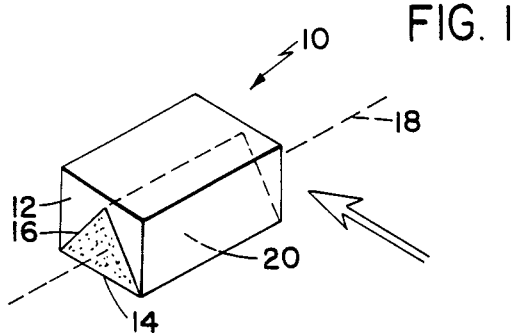
FIG. 1 is a diagramatic perspective view of a PCD bonded within a cubic insert body manufactured according to the invention.

Turn now to the pictorial perspective of FIG. 1 wherein a cutting element, generally denoted by reference numeral 10, is diagramatically depicted. Cutting element 10 is shown as a generally rectangular or cubic body comprised of a metallic portion 12 and a PCD portion 14. In the illustrated embodiment PCD portion 14 is a thermally stable, porous or leached polycrystalline synthetic diamond such as sold by General Electric Company under the trademark, Geoset. Thermally stable silicon-bonded PCD cutters having the same or similar shape are also available and are included in the embodiment. PCD 14 in the illustrated embodiment is thus shown as a prismatic triangular element having equilateral sides 16 and a longitudinal axis symbolically denoted by dotted line 18. Geosets in the presently commercial form are provided in two sizes, namely 2101 Geosets which are approximately 4 mm on side 16 with a length of 2.6 millimeters in the direction of axis 18, and 2103 Geosets which are 6 millimeters on the side 16 and 3.9 millimeters in length along axis 18. PCD 14 is thermally stable, that is generally stable at the temperatures normally encountered in furnacing within conventional infiltration manufacturing techniques. Such furnacing temperatures are normally in the range of 1050° C. to 1250° C. In one embodiment PCD 14 is thus a synthetic diamond compact which has been leached to remove all or substantially all of its metallic, nondiamond content, thereby leaving a sintered, porous, or at least partially porous diamond product. As will be described in greater detail in FIGS. 9 and 10, cutting element 22 is formed by hot-press molding the metallic portion 30 about PCD 24.

Metallic portion 12 is formed from a mixture of metallic powders according to principles well known in the field of powder metallurgy. Generally, metallic portion 12 is comprised of constituents which are the same as or substantially similar to the matrix material of which the infiltrated bit is later formed. Therefore, in the illustrated embodiment, metallic portion 12 is comprised of tungsten carbide powders mixed with various metallic binders which is then hot pressed with PCD element 14 to form the cutter element generally denoted by reference numeral 10.

In the embodiment of FIG. 1, cutter element 10 is thus comprised of a PCD element 14 disposed within the base of element 10, thereby providing and forming the lower surface of element 10, hidden from view in FIG. 1, and at least a portion of the leading face 20 of element 10. Again in the embodiment of FIG. 1, PCD 14 extends only partially across the height thereby leaving PCD 14 embedded within a rectangular structure. It is entirely within the scope of the invention that other equivalent geometrical configurations of PCD 14 within rectangular element 10 could also be chosen and that other overall shapes for PCD 14 other than a triangular prismatic shape are contemplated as well. As will subsequently be described in connection with the bit illustrated in FIGS. 6-8, leading face 20 of element 10 is either fully or partially exposed above the surface of the matrix body and adjacent to the waterway, collector or pad.

Metallic portion 12 of element 10 has thus far been described as containing tungsten carbide to provide wear resistance. However, it is further within the scope of the invention that metallic portion 12 may have dispersed therein a natural or synthetic diamond grit of preselected size according to the wear abrasive properties desired. Such dispersion of diamond grit may be uniformly disposed throughout metallic portion 12 or selectively disposed at the wearing edge such as leading face 20.

Figure 2:
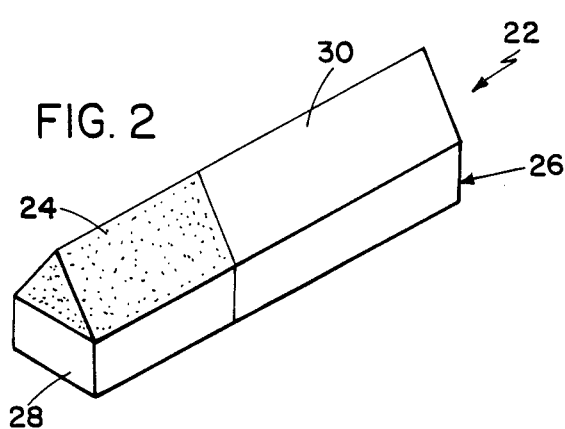
FIG. 2 is a diagramatic pictorial perspective of a second embodiment of a cutting element manufactured according to the invention.

Turn now to a second embodiment of the invention as diagrammatically depicted in perspective view in FIG. 2. As previously stated, each of the embodiments of FIGS. 1-5 are manufactured according to the same general methodology illustrated in FIGS. 9 and 10. In the embodiment of FIG. 2 the cutting element, generally denoted by reference numeral 22, is comprised of a PCD 24 and a metallic portion 26. As in the case of the first embodiment of FIG. 1, PCD 24 may be a triangular prismatic element such as a Geoset. Metallic portion 26 again is a hot-pressed matrix which contains tungsten carbide. Metallic portion 26 is further characterized by a generally rectangular lower portion or base 28 and an upper back supporting portion 30 which are integrally formed. In the case where PCD 24 is a triangular prismatic shape, back support 30 is a similar congruent prismatic shape extending from the rear surface of PCD 24, hidden from view in FIG. 2, to the rear portion of metallic portion 26. In the event that a different geometric shape is chosen for PCD 24, back support portion 30 would have a similar congruous supporting shape.

The bond between metallic portion 26 and PCD 24 as formed in the second embodiment to FIG. 2 can now be compared to that as formed in the first embodiment of FIG. 1. In the embodiment of FIG. 2 both the rear and lower surfaces of PCD 24 are provided for bonding, whereas in the embodiment of FIG. 1 only the side surfaces of PCD 14 are presented for bonding. Metallic portion 26 in the second embodiment and metallic portion 12 in the first embodiment thus form an intimate contact with the adjacent PCD surfaces, thereby forming the means by which the PCD is bonded to the cutting element. The cutting element 10 in the first embodiment and element 22 in the second embodiment respectively, are then disposed within a mold and the matrix body infiltrated about the cutting element in a conventional manner. The matrix material of the element's body thus forms a secure bond with metallic portion 12 in the first embodiment or metallic portion 26 in the second embodiment with the identical or similar material of the matrix body of the bit. As described above, the bonding which may form during the infiltration process between the matrix body and the PCD 14 or 24 is entirely ancillary to the invention and such a bond, if any, would not be relied upon for retaining PCD 14 or 24 on the face of the bit.

Figure 3:
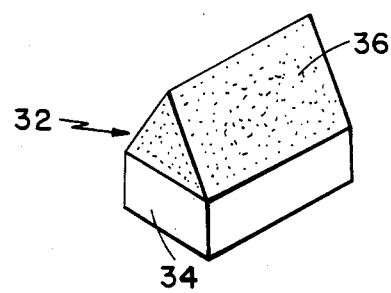
FIG. 3 is a pictorial perspective of a third embodiment of a cutting element manufactured according to the invention.

Turn now to the embodiment of FIG. 3. In FIG. 3 the cutting element, generally denoted as reference numeral 32, is comprised of a metallic portion 34 and a PCD 36.

Once again, PCD 36 in the illustrated embodiment is a porous thermally stable synthetic diamond such as a Geoset. However, nonporous silicon cemented polycrystalline diamond is also included. In the embodiment of FIG. 3, PCD 36 is bonded to metallic portion 34 only along its lower side surface, hidden from view in FIG. 3. Metallic portion 34 thus provides a rectangular basal means or root for forming a secure bond with adjacent metallic matrix material on one hand, and on the other for maintaining a strong bond with PCD 36 without entailing the trailing support 30 of the embodiment of FIG. 2.

Figure 4:
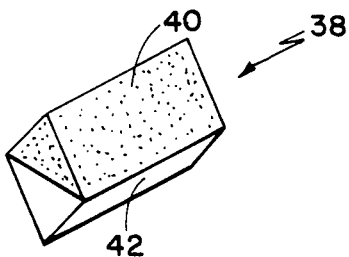
FIG. 4 is a pictorial perspective of a fourth embodiment manufactured according to the invention.

A fourth embodiment of the invention is illustrated in FIG. 4 in pictorial perspective view. Once again the cutting element, generally denoted by reference numeral 38, is comprised of a triangular prismatic PCD 40 and a metallic portion 42. Like the embodiment of FIG. 3, the embodiment of FIG. 4 utilizes only the lower side surface of the triangular prismatic PCD 40 for bonding with metallic portion 42. However, metallic portion 42 in this embodiment is the mirror image of PCD 40 or has a substantially similar triangular prismatic shape to that of PCD 40. Metallic portion 42 thus serves as the root of a cutting tooth by which PCD 40 can be bonded to the matrix material of an infiltrated bit without entailing the rectangularly shaped root provided by metallic portion 34 of the embodiment of FIG. 3.

Figure 5:
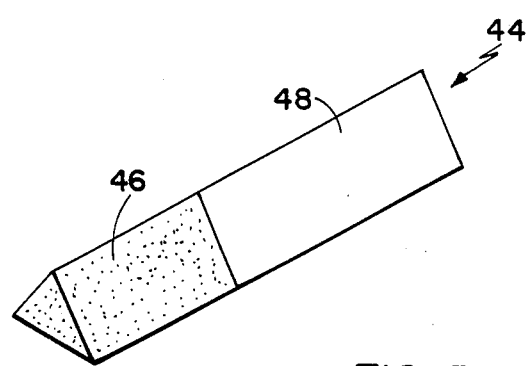
FIG. 5 is a pictorial perspective of a fifth embodiment of a cutting element manufactured according to the invention.

FIG. 5 is directed to yet a fifth embodiment of the invention wherein the cutting element, generally denoted by reference numeral 44, is comprised of a leading PCD portion 46 and a trailing metallic portion 48. The bonding surface between PCD 46 and metallic portion 48 in this case is solely the rear surface of the congruous triangular prismatically shaped element 46. The bonding of cutting element 44 with the matrix bit is then provided through the surfaces of metallic portion 48 which also provides gross trailing mechanical support as does trailing portion 30 of the embodiment of FIG. 2, but without entailing the basal portion of element 22 as depicted by metallic portion 28.

The embodiments of FIGS. 1-5 illustrate the flexibility by which one or more surfaces, including the end, bottom, back and side surfaces of the PCD, may be chosen and provided for bonding according to the invention to an adjacent congruous or noncongruous similarly or distinguishably shaped metallic portion. In each instance the metallic portion then provides the principal part of the cutting element which is bonded to the metallic matrix of the infiltrated bit. The metallic portion is then chosen according to the desired application and tooth design to incorporate such diamond-to-metal bonding planes as may optimize the strength of retention of the PCD on the matrix face as determined by the placement and orientation of the cutting element on the matrix face with respect to the stresses and direction of cutting. In addition, the metallic portion of the cutting element is configured geometrically to also incorporate mechanical strengths or properties such as illustrated by the side supports of metallic portion 12 of the embodiment of FIG. 1 or the trailing back support of the embodiments of FIGS. 2 and 5.

Figure 6:
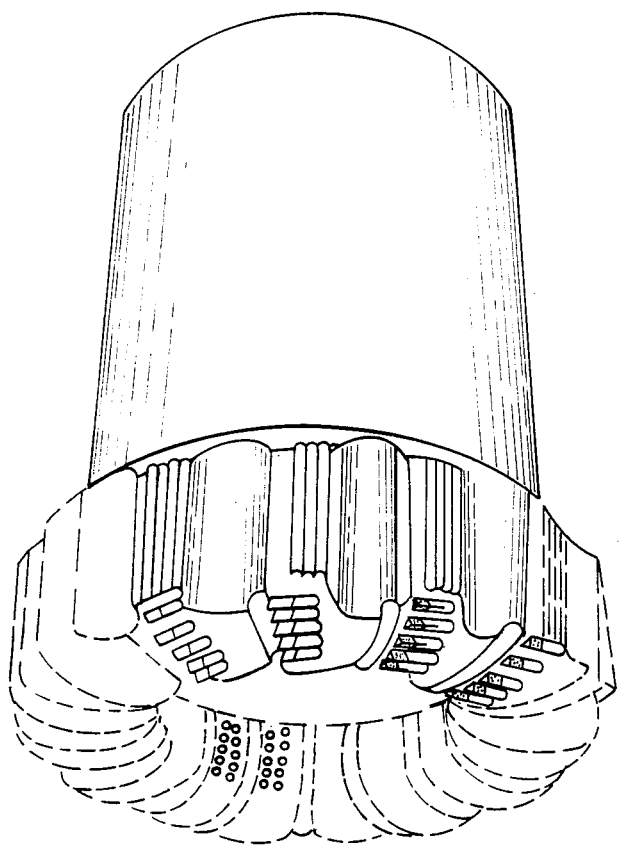
FIG. 6 is a pictorial perspective of a coring bit incorporating the cutting element shown in FIG. 2.

Turn now to the pictorial perspective of FIG. 6 wherein a bit incorporating a cutting element such as shown in the embodiment of FIG. 2 has been manufactured using conventional infiltration techniques. Bit 50 is comprised of a steel shank 52 onto which has been molded a tungsten carbide matrix crown 54. Crown 54 is characterized by a gage 56 and a bit face 58. Gage 56 includes a plurality of conventional junk slots 60 defined by gage pads 62. Gage pads 62 include a plurality of flush set or surface set natural diamonds set within the bit in the conventional manner. A row 64 of cutting teeth 66 is shown on bit face 58 as radially extending from outer gage 56 to inner gage 68. Inner gage 68 may similarly be provided with a plurality of gage-cutting elements similar to those shown on outer gage 56.

In the illustrated embodiment, each row 64 of teeth 66 is also associated with a waterway 70 adjacent to row 64. Hydraulic fluid is provided through bit 50 through inner gage 68, and flows across bit face 58, including along waterways 70 and thence to junk slots 60 to provide for cooling and lubricating of the bit.

Figure 7:
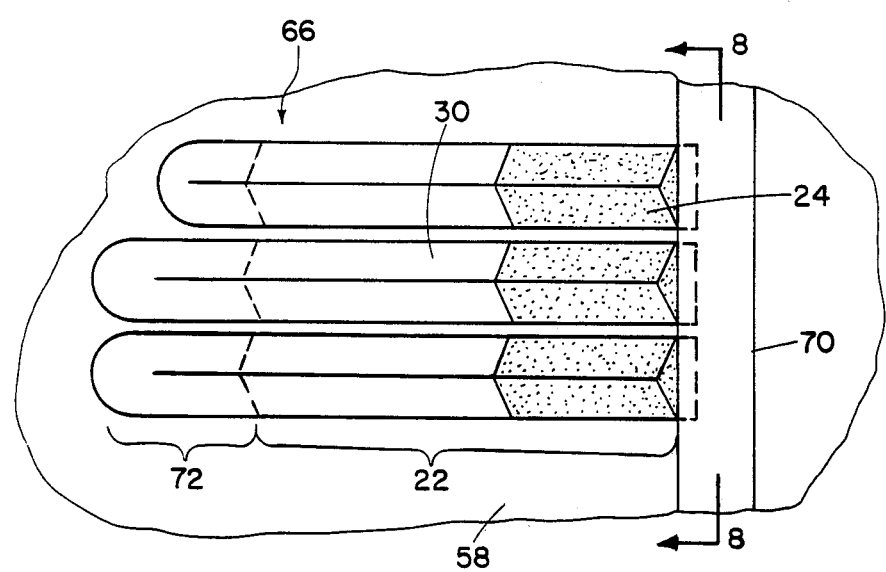
FIG. 7 is an elevational view of three of the teeth depicted in the coring bit of FIG. 6.

Turn now to FIG. 7 which shows an elevational plan view of three of the teeth 66 shown in bit 50 of FIG. 6. Each tooth 66 is comprised of a cutting element 22 as described in connection with FIG. 2, and a trailing portion generally denoted in FIG. 7 as tooth element 72. As depicted in FIG. 7, cutting element 22 is disposed immediately adjacent to waterway 70 and above bit face 58. The cutting action is thus provided by a fully exposed PCD 24, and where metallic portion 30 is diamond impregnated, also by trailing support 30. Cutting element 22 in turn is supported by trailing tooth element 72, which securely bonds with the rear surface of trailing support 30 during the furnacing step of the conventional infiltration process.

Figure 8:
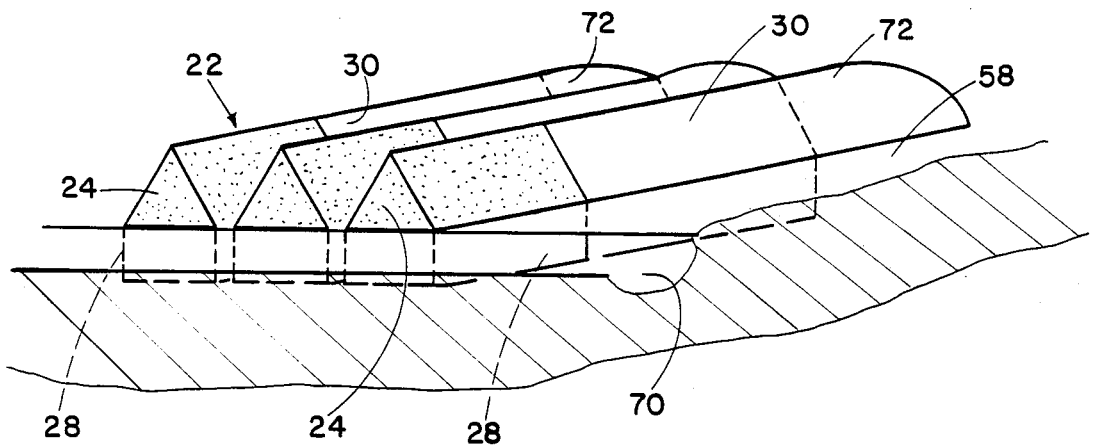
FIG. 8 is a front perspective view of the three teeth shown in FIG. 7 as seen from Line 8—8.

FIG. 8 shows a front perspective view of teeth 66 in FIG. 7 as seen from line 8—8 of FIG. 7. The depiction of FIG. 8 clearly shows that PCD 24 is at or above bit face 58 and adjacent to the edge of waterway 70. It is of course entirely possible that, if desired, a portion of PCD 24 may be disposed below bit face 58 and provide a further means for anchoring cutting element 22 to bit 58. Metallic portion 28 is shown in a dotted outline within FIG. 8, and illustrates the secure rooted tooth structure which allows bonding of the matrix body bit with cutting element 22.

Figure 9:
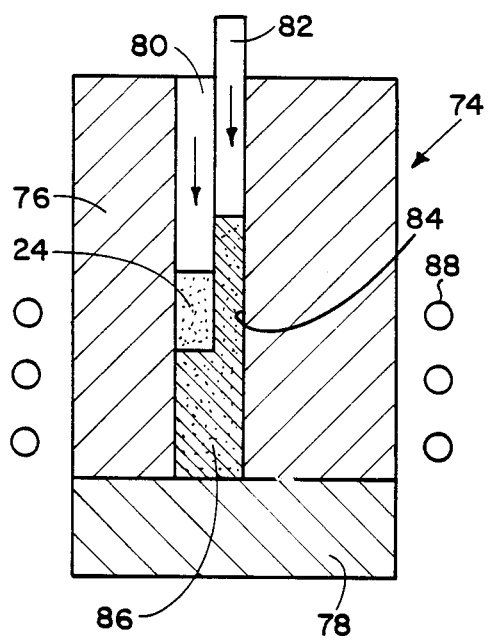
FIG. 9 is a simplified cross-sectional view of a loaded mold used to manufacture the embodiment of FIG. 2 shown prior to pressing.

Various embodiments of the tooth structure now having been described in connection with FIGS. 1-5, and a particular application of one of such embodiments in a petroleum coring bit having been illustrated in connection with FIGS. 6-8, the method of manufacture of the cutting element can be described in connection with FIGS. 9 and 10. Turn now to FIG. 9, which is a simplified cross-sectional view of a mold filled with the constituents from which cutting element 22, for example, is to be manufactured. Mold 74 is depicted as including an integral carbon body 76 and a mating base 78. As better depicted in FIG. 10, the desired cross-sectional profile of the cutting element is machined into body 76 as desired, and carbon anvils 80 and 82 are machined to have a corresponding congruent shape. Cavity 84 is then loaded with a metallic mixture, including diamond grit if desired, from which the metallic portion of the cutter will be formed. A PCD 24 is glued to the lower end of anvil 80, around which metal mixture 86 has been disposed. Because PCD 24 is substantially incompressible, and metallic mixture 86 is highly compressible, anvil 82 is vertically offset compared to anvil 80 by an amount equal to the compressibility of metallic charge 86.

Figure 10:
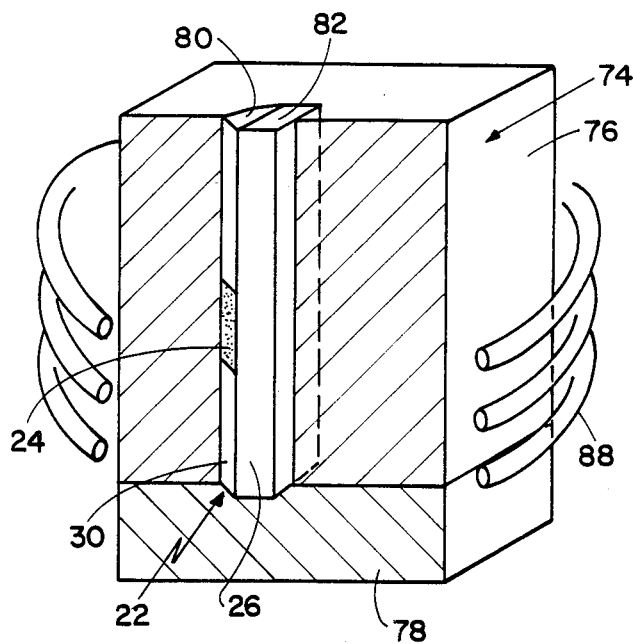
FIG. 10 is a partially cut away perspective view of the mode shown in FIG. 9 after pressing.

A downward vertical pressure in a conventional hot press is then applied to anvils 80 and 82, bringing the anvils into alignment at the end of the hot pressing procedure as shown in partially cutaway perspective view in FIG. 10. The elements of the press, being entirely conventional, have been omitted from the views of FIGS. 9 and 10 for sake of clarity. Metallic charge 86 is simultaneously heated within cavity 84 by a conventional induction heater diagramatically depicted by induction coils 88. The resulting structure is a cutting element 22 as described in connection with FIG. 2.

While in the press, metallic charge 86 is subjected to a pressure of approximately 460 kiliograms per square centimeter and heated to a temperature of approximately 1,060 centigrade and held at that temperature and pressure for approximately four minutes.

It has also been observed that a better bond forms between metallic portion 26 and Geoset if PCD 24 is first carefully cleaned in a boiling acid wash of aqua regia for five to ten minutes followed by a room temperature, water rinse, and ethyl alcohol rinse followed by a hot air drying technique. Thereafter, the cleaned PCD 24 is not handled with bare hands and is hot pressed as soon thereafter as practical, preferably within one hour, to form cutting element 22. If greater time is required after cleaning PCD 24 before hot pressing the element into a cutting element. Special storage is used to maintain cleanliness. The cleaned PCD can be maintained in a clean condition by submersed storage in ethyl alcohol. The element is then retrieved from the ethyl alcohol storage and hot-air dried just prior to use in the manufacturing process.

What results is a surprisingly strong bond between a metallic portion of the cutting element and the PCD. The exact mechanism of bonding therebetween is presently imperfectly understood. It is contemplated that the nature of the bond may be a combination of both a mechanical and chemical bond. The hot-pressed matrix material appears to penetrate into the roughened surface of the adjacent diamond, thereby forming a micromechanical bond. The penetration which is observed into the roughened surface is generally better than that which is achieved in conventional infiltration processes, and may be comparable to that found in bonded elements made in a diamond press. However, it is by no means clear that the degree of apparent mechanical bonding which is in fact achieved according to the invention would result at the lower pressures and temperatures in a hot pressing technique, as compared to the substantially and dramatically higher pressures and temperatures achieved within a diamond press. Furthermore, it is presently believed that some type of chemical bonding may also be occurring between the diamond and the metallic matrix material adjacent to it. It is hypothesized that certain of the constituents in the metallic matrix forming a part of the metal portion 26 of cutter 22, for example, each the diamond and convert it into carbide. The matrix of the element thereby chemically bonds to the diamond, possibly through an incomplete conversion process.

In any case, what results is a diamond-to-metal bond which does not subsequently degrade under the furnace temperatures encountered during the manufacture of a matrix body bit and which further retains a bonding strength, for whatever reason, which is adequate for practical performance in a rotary drill bit.

It must be understood that many modifications and alterations may be made by those having ordinary skill in the art witout departing from the spirit and scope of the invention. The embodiments which have been illustrated herein have been set forth only for the purposes of clarity and example, and not as a limitation of the invention. Clearly, thermally stable PCD material other than Geosets and other shaped materials may be employed with a variety of matrix materials without departing from the scope of the invention. Furthermore, although a petroleum coring bit has been illustrated, it is also clearly contemplated that petroleum drilling bits, mining bits, and other abrasive tools could also incorporate a cutting element described according to the invention. Various process parameters, such as the cleaning and handling steps, as well as pressures, temperatures and times used during the hot pressing step, can also be varied without departing from the spirit of the invention. The invention is thus defined in the following claims.

We claim:

1. An improvement in a method for manufacturing a drill bit, said improvement for forming a diamond cutting element for use in said drill bit, said improvement comprising the steps of:

degreasing a preformed integral diamond element;

maintaining said diamond element free of surface contamination; and hot pressing a metallic matrix on a surface of said cleaned diamond element at less than 1400 degrees Centigrade, while said diamond element is maintained free from surface contamination, whereby a secure bond is established between said cleaned diamond element and said metallic matrix forming said cutting element.

2. The method of claim 1 where said step of avoiding subsequent contamination comprises the step of substantially preventing oxidation of said surface of said diamond element.

3. The method of claim 2 where said step of substantially preventing oxidation of said surfaces of said diamond element comprises the step of immediately hot pressing said diamond element with said matrix material after said step of cleaning.

4. The method of claim 2 where said step of substantially preventing subsequent oxidation of said surface of said diamond element comprises the step of maintaining said diamond element in a substantially oxygen-free environment.

5. The method of claim 4 where said step of maintaining said diamond element in an oxygen-free environment comprises the step of maintaining said diamond element submerged in ethyl alcohol until ready to execute said step of hot pressing is executed and then removing said element from said solution of ethyl alcohol and drying said element with hot air.

6. An improvement in a method for manufacturing a matrix body drill bit, said improvement for forming a diamond-cutting element for use in said matrix body bit comprising the steps of:

cleaning a thermally stable, integral, preformed, porous polycrystalline diamond element;

maintaining said diamond element in a cleaned condition subsequent to said step of cleaning;

hot pressing a carbide-forming matrix material at less than 1400 degrees Centigrade to a surface of said diamond element to form an insert while said diamond element is maintained in a cleaned condition, whereby said insert thus formed is later usable in an infiltration bit formed by conventional powder metallurgical techniques.

7. The method of claim 6 further comprising the step of mixing diamond grit into said matrix material prior to said step of hot pressing.

8. The method of claim 6 further comprising the step of infiltrating said insert into a matrix body bit.

9. The method of claim 6 where said step of hot pressing is characterized by hot pressing a trailing support on a rear surface of said diamond element to form said insert.

10. The method of claim 6 where said step of hot pressing is characterized by hot pressing said matrix material on a lower surface of said diamond support, thereby forming a root for said insert.

11. The method of claim 6 where said step of hot pressing is characterized by hot pressing said matrix material on at least two adjacent surfaces of said diamond element.

* * * * *